United States Patent [19]

Pakula

[11] Patent Number: 4,585,924
[45] Date of Patent: Apr. 29, 1986

[54] SELF-CONTAINED ELECTRIC DIESEL ENGINE FUEL FILTER ASSEMBLY HEATER

[75] Inventor: Benjamin J. Pakula, Dearborn, Mich.

[73] Assignee: Ford Motor Company, Dearborn, Mich.

[21] Appl. No.: 683,331

[22] Filed: Dec. 19, 1984

Related U.S. Application Data

[63] Continuation-in-part of Ser. No. 529,352, filed as PCT US83/01220, Aug. 8, 1983, § 102(e) date Aug. 8, 1983, abandoned, which is a continuation-in-part of Ser. No. 456,072, Nov. 22, 1982, abandoned.

[51] Int. Cl.[4] .............. F02M 31/12; F24H 1/10; B01D 35/18; H05B 3/80
[52] U.S. Cl. .............................. 219/205; 123/549; 123/557; 210/184; 219/296; 219/299; 219/306; 219/338; 219/505
[58] Field of Search ............... 219/205–207, 219/296–299, 302–309, 504, 505, 338; 210/184–186, 181; 123/549, 557

[56] References Cited

U.S. PATENT DOCUMENTS

| 2,899,530 | 8/1959 | Wunstorf | 219/205 |
|---|---|---|---|
| 3,235,084 | 2/1966 | King et al. | 219/205 X |
| 4,091,265 | 5/1978 | Richards et al. | 219/306 X |
| 4,146,475 | 3/1979 | Forsland | 219/205 X |
| 4,321,136 | 3/1982 | Matsui | 219/505 X |
| 4,354,946 | 10/1982 | Warlick et al. | 219/205 X |
| 4,369,110 | 1/1983 | Picek | 219/205 |
| 4,372,260 | 2/1983 | Baker | 123/557 X |
| 4,372,279 | 2/1983 | Parks | 219/205 X |
| 4,387,691 | 6/1983 | Marcoux et al. | 219/296 X |
| 4,395,996 | 8/1983 | Davis | 210/186 X |
| 4,406,785 | 9/1983 | Siefer | 219/205 X |

FOREIGN PATENT DOCUMENTS

| 2804804 | 8/1979 | Fed. Rep. of Germany | 219/302 |
|---|---|---|---|
| 2804749 | 8/1979 | Fed. Rep. of Germany | 219/303 |
| 2845520 | 5/1980 | Fed. Rep. of Germany | 219/205 |
| 2845519 | 5/1980 | Fed. Rep. of Germany | 219/205 |
| 310322 | 8/1933 | Italy | 219/303 |
| 134546 | 10/1929 | Switzerland | 219/303 |
| 2100559 | 12/1982 | United Kingdom | 219/306 |

Primary Examiner—A. Bartis
Attorney, Agent, or Firm—Robert E. McCollum; Clifford L. Sadler

[57] ABSTRACT

A self-contained fuel oil heater unit for use with a diesel engine includes a fuel oil manifold having a spin-on cartridge type oil filter with a central fuel oil outlet and peripheral fuel oil inlets. The upper portion of the manifold contains an upwardly open bowl-shaped recess closed by a removable cover and defining a reservoir containing an electric immersion PTC heating element for warming the fuel oil. The unheated fuel oil flows through a horizontally disposed inlet on the lower portion of the manifold into the reservoir where it is heated and is discharged through a passage communicating with the peripheral fuel oil inlets of the filter. A further manifold passage communicates the central fuel oil outlet of the filter to a horizontally disposed outlet on the lower portion of the manifold. Alternatively the heater unit can be formed as a spacer insertable between the manifold and spin-on filter and containing a star-shaped PTC heater.

1 Claim, 6 Drawing Figures

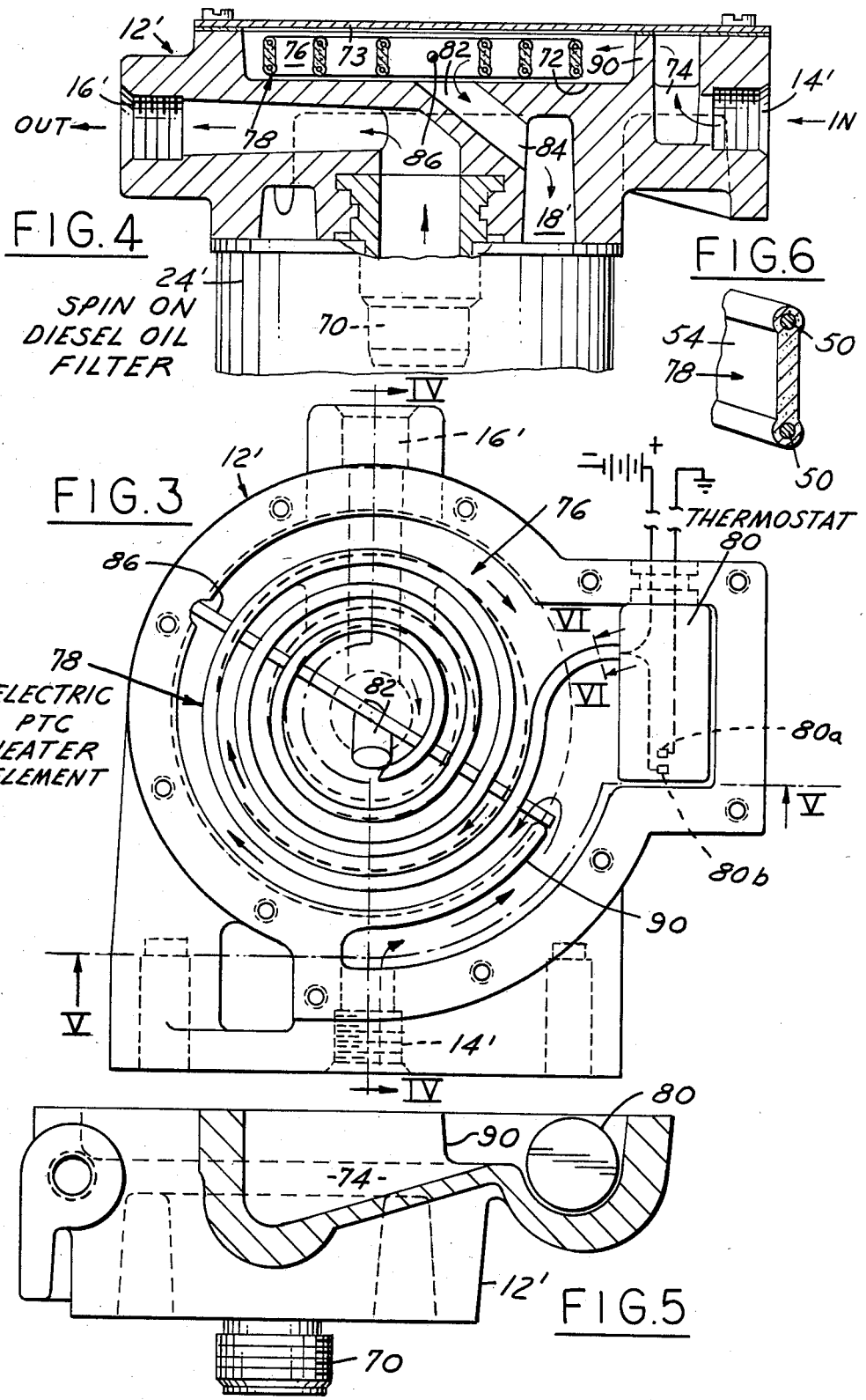

SELF-CONTAINED ELECTRIC DIESEL ENGINE FUEL FILTER ASSEMBLY HEATER

This application is a continuation-in-part of U.S. Ser. No. 529,352, filed PCT US 83/01220, 08/08/83, § 102(e) date 08/08/83, which was a continuation-in-part of U.S. Ser. No. 456,072, filed 11/22/82, both now abandoned.

This invention relates in general to a diesel engine. More particularly, it relates to a heater unit that can be readily applied to a diesel engine having a spin-on type fuel filter.

The use of diesel engine fuel heaters to prevent fuel oil clouding is known. A drop in temperature below a predetermined level allows wax crystals to form, which restricts flow through and may plug the fuel filter, causing poor drivability, power loss, and eventual flame-out. The problem usually occurs after the operator has started the engine and driven a short distance before engine fuel starvation is realized by the engine faltering and flaming out. More often than not, the only method of restarting the engine is to tow the vehicle to a warm area where the fuel system may be defrosted.

A common solution has been to provide an inline heater to maintain the fuel temperature above the cloud point. However, since the specifications for either cloud point or pour point (the temperature at which fuel ceases to flow) are not uniform among fuel suppliers, this type of heater is often only borderline effective.

Heaters that are incorporated directly into the fuel filter also are known. However, these generally are complicated, costly constructions that are not suitable for retrofitting to a diesel engine that has a spin-on type fuel filter since the entire filter unit and manifold must be replaced as well as the mounting modified.

Muller, U.S. Pat. No. 2,902,158, shows a unit fuel filter connected to a fuel manifold and having a centrally located heater unit surrounded by a number of candle type filter elements. The fuel flows from outside to inside the filter prior to being heated. Low temperature fuel may form wax crystals on the outside of the filter and plug it prior to the heater element being effective to prevent the same.

King et al, U.S. Pat. No. 3,235,084, shows a one-piece fuel manifold-filter also having a centrally located heater element. Replacement of a filter unit would require replacement of the entire unit to retrofit it to a diesel engine, which is not practical or economical.

Prier, U.S. Pat. No. 3,463,317, merely shows the use of an adapter or spacer between an oil manifold and a spin-on type oil filter to reroute incoming oil to a cooler prior to entering the filter.

Barrow, U.S. Pat. No. 3,550,781, shows a fuel vaporizing unit having a spacer element between a filter and liquid fuel. The spacer contains a heater coil; however, the unit is not adaptable as a simple insert between a diesel engine fuel manifold and spin-on filter.

Richards et al, U.S. Pat. No. 4,091,265, shows a filter assembly integral with a fuel manifold and having a transistorized heat conducting ring for incoming fuel. Such a construction would be costly to manufacture, require a special installation, and would not be adaptable for a simple retrofit.

van Konynenburg, U.S. Pat. No. 4,304,987, shows an electrical heater including a positive temperature coefficient (PTC) element joined to a constant wattage (CW) element by a carbon black composition in a manner such that when electrical current is supplied to the two elements, a relatively constant source of heat is produced up to a predetermined temperature level or switch point, whereupon the heater becomes self-regulating, thereby eliminating the need for a separate shut-off switch to control the heat output.

None of the above constructions provide a simple cartridge type heater unit that can easily be inserted between a conventional diesel engine fuel manifold and its spin-on type fuel filter, or, alternatively, a heater unit that can easily be incorporated directly into the fuel filter fuel manifold, and made operative simply by connecting the leads from the heater to the engine electrical system. In each of the prior art cases above, the construction generally requires a specific installation that does not lend itself to a retrofit installation on other vehicles without a complete modification of the original structure.

It is a primary object of this invention, therefore, to provide a diesel fuel oil heater unit that can readily be applied to diesel engine vehicles employing spin-on type fuel oil filters.

It is another object of the invention to provide a heater unit of the type described in which the heater is self-limiting in output temperature level to eliminate the need for a separate shut-off switch.

It is also an object of the invention to provide a heater unit as described in which the heater element is star shaped in cross-section with radially extending finger-like portions circumferentially spaced from one another to provide maximum heating area exposure to the incoming fuel flow.

It is a still further object of the invention to provide a fuel oil heater unit consisting of a self-contained cartridge type spacer unit adapted to be inserted between the usual manifold and the fuel filter.

A further object of the invention is to provide a fuel oil heater unit totally contained in the fuel manifold itself.

Other objects, features and advantages of the invention will become more apparent upon reference to the succeeding detailed description thereof, and by reference to the drawings illustrating the preferred embodiment thereof; wherein, FIG. 1 is a cross-sectional view of a diesel engine fuel filter/heater unit embodying the invention;

FIG. 3 is a top plan view with the cover removed of an alternative embodiment of the invention, and FIGS. 4, and 5 6 are cross-sectional views taken on planes indicated by and viewed in the direction of the arrows IV—IV and V—V and VI—VI of FIG. 3.

Figure 1:
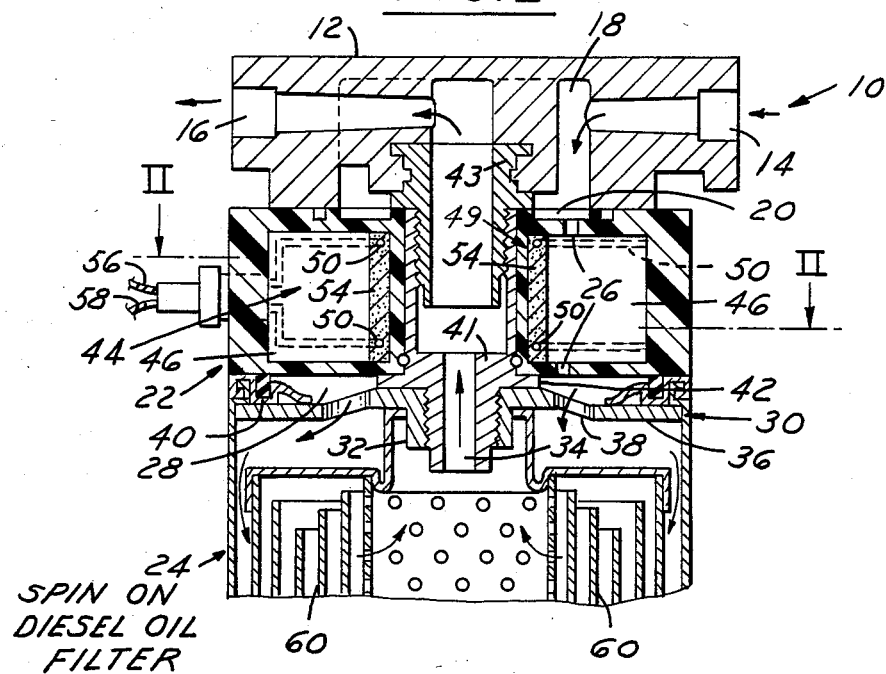

FIG. 1 shows a diesel engine fuel filter assembly 10. It includes a base cover unit 12 that defines a fuel manifold having a fuel inlet passage 14 and an outlet passage 16. Inlet passage 14 is intersected by an annular plenum chamber 18 that is matingly aligned with a fuel annulus 20 formed in the top of a spacer 22.

The spacer is a unitary cartridge type adapted to be inserted between manifold 12 and a spin-on type fuel filter 24 to be exposed to the flow of the fuel between the manifold and filter in a manner to be described. More particularly, the spacer 22 is of a diameter comparable to that of the manifold and filter to present a flush overall outside surface. It is provided with a number of coaxially extending, circumferentially spaced passages 26 that extend at their upper end from fuel annulus 20 to the annular fuel inlet plenum 28 at the outer periphery of fuel filter 24.

The fuel filter 24 is of conventional paper pleated type construction consisting of a base plate 30 having a central threaded bore 32 defining an outlet 34 for the filtered fuel. A flanged portion 36 contains circumferentially spaced holes 38 for receiving the fuel from spacer 22. An O-ring seal 40 abuts the lower face of spacer 22 to seal against the leak of fuel outwardly.

The fuel filter 24 is adapted to be screwed or spun on against the lower face of spacer 22 in the same manner as the filter is attached to the fuel manifold in the case where no spacer is present. That is, the spacer 22 first is placed up over the end of an externally threaded nipple 43 that is cast in and depends from the manifold. A second nipple 41 that is internally threaded at its top is screwed onto the nipple 43 with the spacer 22 between the manifold and a nut 42 that is formed on nipple 41 for locating the spacer in place. The spin on filter, with its internally threaded bore 32, then is screwed onto the lower threaded end of nipple 41 to complete the assembly.

Figure 2:
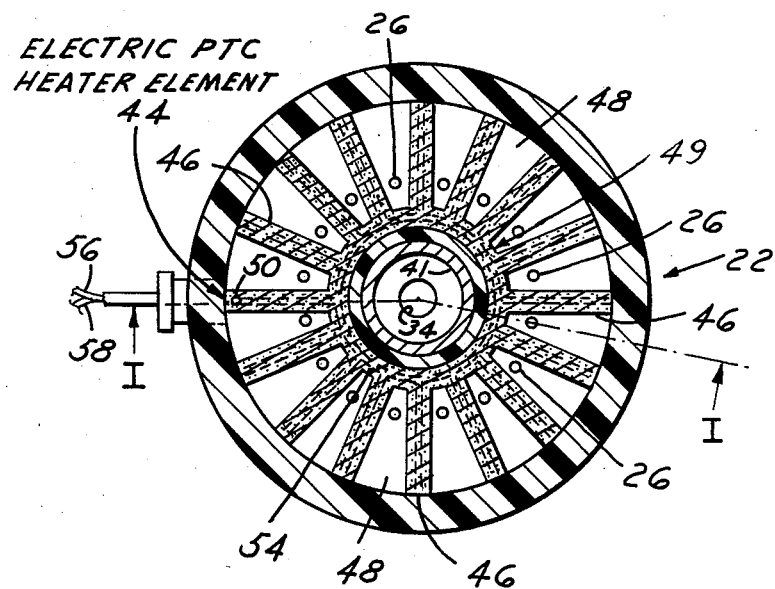
FIG. 2 is a cross-sectional view taken on a plane indicated by and viewed in the direction of the arrows II—II of FIG. 1.

Turning now to the invention, spacer 22 contains in this case a star-shaped heater 44 that is defined by radially extending finger-like portions 46 that are equally circumferentially spaced from one another to provide clearances 48 between and are all integral at their bases with a hub 49 of similar material. As best seen in FIG. 2, the passages 26 extend between the spokes or fingers 46 of the heater to provide the greatest area of exposure to the flowing fuel.

The heater in this instance is a self-output temperature limiting PTC (positive temperature coefficient) element. Each of the finger-like portions 46 and the hub 49 are segments cut from a tape-like material consisting of a pair of parallel copper wire conductors 50 (see also FIG. 6) connected and encased within an intervening conductive core 54 of carbon black composition, similar to that described in U.S. Pat. No. 4,372,279, and shown in FIGS. 3 and 4 therein. The core 54 is an irradiated self-output temperature limiting material that is coated and sealed with a suitable plastic material, and at the remote end, such as the ends of the finger-like portions 46, is simply cut off and capped with plastic material or left uncapped, as desired. A pair of leads 56 and 58 extend outwardly of the spacer from the wires 50 to a suitable connection to the diesel engine electrical system (not shown) to be energized whenever the engine is operating. The characteristics of the heater are such that the internal temperature of the heater increases at a fairly constant level with application of electrical current up to a certain temperature level, i.e., switch point, such as, for example, 250° F., at which point the internal resistance of the heater increases markedly to a point where no further increase in heat output is provided. Thus, the element has a built-in or self-contained shutoff device that eliminates the need for a separate switch to accomplish the same purpose.

In operation, therefore, as soon as the engine is start, current is supplied to element 44 which begins heating. Therefore, when fuel flows through inlet 14, 18 and into spacer 22, fuel flow between the finger-like portions of the heater will absorb the heat therefrom and maintain the fuel at a temperature level preventing waxing, etc., as it prepares to enter the filter unit 24. The fuel flow then continues through paper-pleated filter portion 60 passing radially inwardly into the center core wherefrom it progresses upwardly back through spacer 22 and into the outlet passage portion 16 of the fuel manifold 12.

An alternative solution to adding a heater between the fuel manifold and the conventional spin-on type fuel filter is to incorporate the fuel heater into the top of the manifold istself. This would require no special mounting bracket to attach the filter assembly to the engine, in contrast to the construction shown in FIG. 1. In the case of FIGS. 3-6 showing, only a modification of the fuel manifold itself would be required plus a means to connect the heater electrically to the vehicle engine for operation whenever the engine is operative.

More specifically, FIGS. 3-6 show a fuel filter assembly similar in construction to that illustrated in FIG. 1. The fuel manifold 12' includes a horizontal fuel oil inlet 14', a horizontally disposed fuel outlet passage 16', a vertically inclined fuel inlet passage 18' leading to the outer periphery of the fuel filter, and an adapter nipple 70 onto which is screwed the spin-on type fuel filter 24'.

Manifold 12' in this case is provided at its top with an integral bowl shaped recess 72 constituting a fuel reservoir. It is adapted to be closed by a suitable disc shaped cover 73 shown in FIG. 4 but omitted in FIG. 3 for clarity. As best seen in FIG. 3, the fuel oil inlet 14' connects to an intersecting passage 74 that angles upwardly as indicated in FIG. 5 to the bottom of the recess or fuel reservoir 76. Adapted to be immersed in the fuel oil is a flat strip-like coiled electric heater 78 connected as shown in dotted lines in FIG. 3 to a combination thermostat/heater control 80 contained in one end of the manifold. The control 80 would be electrically connected by the wiring shown, including bimetallic contacts 80a and 80b, to the vehicle electrical system so as to be energized or rendered electrically operative at all times when the vehicle engine is operative.

As shown in FIG. 6, the heater 78 is of essentially the same material as the heater shown in FIGS. 1 and 2; that is, a thin tape of two wire conductors 50 connected by a conductive core 54 of PTC material that is coated and sealed with a suitable plastic material (not shown in FIG. 6), and at the remote end may be simply cutoff and capped with plastic material, to provide a self-output temperature limiting heater element. The heater 78 is coiled as shown and is of a depth or height equal to that of the depth of the reservoir so as to provide a spiral passage for flow of the fuel oil inwardly to a central outlet 82 as indicated by the arrows. The latter is connected by an angled passage 84 to the inlet 18' to filter assembly 24'. A toothpick-like plastic pin 86 extends through the coils of the heater element 78 to secure it in place without obstructing flow. The curved wall portion 90, defininf a portion of the fuel reservoir, also acts as a guide for the incoming fuel oil in passage 74.

In operation, fuel oil entering the inlet passage 14' travels diagonally upwardly as shwon in FIG. 4 to the end of the guide wall 90. At this point, the strap-like coil of heater 78 forms a wall to force the flow between it and the manifold and force fuel oil flow in a spiral path toward the outlet 82. The heater being energized as soon as the vehicle engine becomes operative, the fuel oil is warmed prior to its discharge into the inlet passage 18'. In this case, the combination thermostat/heater control 80 becomes inoperative above a predetermined temperature level and, therefore, shuts off the current to the heater element 78 when it is not needed to warm the fuel oil above the cloud point.

From the foregoing, it will be seen that the invention provides several embodiments of a fuel oil heater that readily can be adapted to most diesel engines that have a spin-on type filter attached to the fuel manifold.

While the invention has been shown and described in its preferred embodiments, it will be clear to those skilled in the arts to which it pertains that many modifications and changes may be made thereto without departing from the scope of the invention.

I claim:

1. A self-contained fuel oil heater unit for use with a diesel engine, the unit including a fuel oil manifold and a spin-on cartridge type fuel oil filter attached thereto, said filter including an end having a central fuel oil outlet and peripheral fuel oil inlets, the fuel oil manifold having a first portion formed with horizontally disposed fuel oil inlet and outlet passages, a second manifold portion projecting upwardly from the first portion as an extension thereof, the second portion of the manifold being formed with an upwardly open bowl shaped recess in the top surface thereby constituting a fuel oil reservoir integral with the manifold, a removable cover closing said recess, an electrically operative heater element positioned in said recess, and adapted to be immersed in the fuel oil in the reservoir for warming the fuel oil, the fuel inlet and outlet passages each communicating respectively with other passages in said manifold connected to an inlet to the reservoir and to the outlet of the fuel filter, a further fuel outlet in said manifold for conducting the warmed fuel oil from the reservoir through the manifold first portion to the peripheral fuel oil inlets on the end of the fuel oil filter for flow through the peripheral edges thereof into the filter proper and out through the filter outlet to the fuel oil outlet passage, and means connecting the heating element to the electrical system of a diesel engine to be operative upon the engine being rendered operative.

* * * * *